United States Patent
Matsukawa et al.

(10) Patent No.: US 6,384,151 B1
(45) Date of Patent: May 7, 2002

(54) DICYCLOPENTADIENE-MODIFIED UNSATURATED POLYESTER AND PROCESS FOR PRODUCING THE SAME AS WELL AS RESIN COMPOSITION AND MOLDING MATERIAL EACH CONTAINING UNSATURATED POLYESTER

(75) Inventors: Kenji Matsukawa, Osaka; Toshio Hayashiya, Toyono-cho; Koji Takabatake, Mino; Katsura Hayashi, Kobe; Hironori Funaki, Suita, all of (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/584,340

(22) Filed: Jun. 1, 2000

Related U.S. Application Data

(63) Continuation of application No. PCT/JP99/00518, filed on Feb. 5, 1999, now abandoned.

(51) Int. Cl.⁷ .......................... C08L 67/06; C08G 63/52
(52) U.S. Cl. .................. 525/445; 525/44; 528/298; 523/527
(58) Field of Search ...................... 528/298; 525/44, 525/445

(56) References Cited

U.S. PATENT DOCUMENTS

| | | | | |
|---|---|---|---|---|
| 4,148,765 A | * | 4/1979 | Nelson | 428/430 |
| 4,332,931 A | | 6/1982 | Hasegawa et al. | |
| 4,435,530 A | * | 3/1984 | Hefner | 533/512 |
| 5,770,653 A | | 6/1998 | Matsukawa et al. | |

FOREIGN PATENT DOCUMENTS

| | | |
|---|---|---|
| AU | 40930/96 | 7/1996 |
| JP | 56-149426 | 11/1981 |
| JP | 62-500034 | 1/1987 |
| JP | 4-132732 A | 7/1992 |
| JP | 4-198209 A | 7/1992 |
| JP | 7-216006 | 8/1995 |
| JP | 8-259640 | 10/1996 |
| JP | 9-111108 | 4/1997 |
| JP | 11-49849 A | 2/1999 |
| WO | WO 86/03757 | 7/1986 |

OTHER PUBLICATIONS

D.L. Nelson, Considerations: Dicyclopentadiene in Polyester Resins, 36th Annual Conference Reinforced Plastics/Composites Institute, The Society of Plastics Industry, Inc. Feb. 16–20, 1981.*

* cited by examiner

Primary Examiner—Patricia A. Short
(74) Attorney, Agent, or Firm—Oblon, Spivak, McClelland, Maier & Neustadt, P.C.

(57) ABSTRACT

The present invention discloses a process for producing a dicyclopentadiene-modified unsaturated polyester. The process includes a first step of reacting a reaction mixture of maleic anhydride (MA) and water ($H_2O$) with dicyclopentadiene (DCPD) and a second step of reacting the reaction product obtained in the first step with a polyhydric alcohol, or a polyhydric alcohol and a polybasic acid, to obtain an unsaturated polyester modified with dicyclopentadiene. In the first step of the process, (1) a molar ratio of water to dicyclopentadiene is greater than 1 and a molar ratio of maleic anhydride to dicyclopentadiene is 1.2 or more,
(2) a molar ratio of water to maleic anhydride is 1 or less, or
(3) both of the features (1) and (2) are satisfied.

The present invention also discloses a polyester resin composition containing the modified unsaturated polyester and a radically polymerizable monomer, and a molding material containing the resin composition as a main component. The molding material gives a molded article having excellent hot water resistance.

14 Claims, No Drawings

DICYCLOPENTADIENE-MODIFIED UNSATURATED POLYESTER AND PROCESS FOR PRODUCING THE SAME AS WELL AS RESIN COMPOSITION AND MOLDING MATERIAL EACH CONTAINING UNSATURATED POLYESTER

This is a continuation of International Application PCT/JP99/00518, with an international filing date of Feb. 5, 1999, now abandoned.

BACKGROUND OF THE INVENTION

1. Field of the Invention

The present invention relates to a novel unsaturated polyester and a process for producing the same as well as a resin composition containing the unsaturated polyester and a molding material containing the resin composition and, more particularly, to an unsaturated polyester modified with dicyclopentadiene, which can be utilized effectively as casting materials, lining materials, resin concretes, artificial marbles and molding materials for reinforced plastic molded articles such as SMC (sheet molding compound) and BMC (bulk molding compound). The present invention also relates to a process for producing the above polyester, a polyester resin composition containing the polyester and a radically polymerizable monomer, and a molding material containing the resin composition.

2. Prior Art

Molded articles using an unsaturated polyester are suitably used in casting and lining because of its excellent moldability, strength, heat resistance and water resistance. The unsaturated polyester is mixed with radically polymerizable monomer and then impregnated to reinforcing fibers such as glass and carbon fibers, to form a fiber-reinforced plastic. Such a fiber-reinforced plastic are often used for materials for bathtubs, water-purifier tanks, boats, vehicles, tanks and housings. As typical examples of the molding material containing the unsaturated polyester may include SMC and BMC.

The unsaturated polyester is generally a polyester obtained by condensing a polybasic acid containing an unsaturated acid partially therein with a polyhydric alcohol, and contains an unsaturated bond derived from the above unsaturated acid.

A molded article is obtained as follows. The above unsaturated polyester is mixed with a radically polymerizable monomer (reactive diluent) such as vinyl monomer to prepare a unsaturated polyester resin composition used for a molding material. Then the molding material containing the resin composition is prepared and cured in a mold to form a molded article. Alternatively, an intermediate product such as SMC and BMC containing the resin composition is prepared, followed by press molding.

On the other hand, a dicyclopentadiene-modified unsaturated polyester is obtained by reacting dicyclopentadiene, maleic anhydride, water, polyhydric alcohol and, if desired, an additional other polyhydric basic. Then, the dicyclopentadiene-modified unsaturated polyester is mixed with such a radically polymerizable monomer as styrene, to prepare a resin composition. The molding materials containing such a modified unsaturated polyester resin composition, for example, are disclosed in the following publications.

Japanese Unexamined Patent Publication No. 54-90285 discloses a molding material comprising polyester, styrene and polystyrene. The polyester is obtained by the addition condensation reaction of partially esterified dicyclopentadienecarboxylic acid, which is a reaction product of dicyclopentadiene, maleic anhydride and water at 150° C. or less, and a polyhydric alcohol. The reference makes it apparent that the molding material can provide a low-shrink molded article having low viscosity and excellent electric characteristics, particularly an excellent high-temperature insulation resistance.

Japanese Unexamined Patent Publication No. 4-132714 discloses a thermosetting resin composition comprising dicyclopentadiene-modified oligomer and a vinyl polymerizable monomer. The oligomer is obtained by dropping water to dicyclopentadiene and maleic anhydride to react them and further reacting the resulting reaction product with glycol. The thermosetting resin composition can provide a molded article having an improved surface smoothness, dimensional stability (low warpage) and hot water resistance.

Japanese Examined Patent Publication No. 6-74301 discloses a dicyclopentadiene-modified unsaturated polyester resin comprising an unsaturated polyester resin using neopentyl glycol as an alcohol component, an unsaturated polyester using dicyclopentadiene as a modifier, a thixotropic agent and a polymerizable monomer. The polyester resin can afford a product having good surface smoothness.

As an example of producing the unsaturated polyester using dicyclopentadiene as a modifying component, this publication discloses a process for adding maleic anhydride to a mixture of dicyclopentadiene and water at a small adding rate so that the reaction mixture has a temperature of 130° C. or less with utilizing the reaction heat generated in the reaction. After the addition of maleic anhydride is completed, the reaction mixture is continued to be heated at 130° C. for 3 hours. Then glycol is added thereto and the temperature of the mixture is gradually raised to react with the glycol at 210° C. When the acid value of the mixture reaches 25 or less, it is judged that the reaction has been terminated and the reaction product is cooled. Subsequently, hydroquinone or a styrene monomer is added to the mixture, to obtain a dicyclopentadiene-modified polyester resin.

Published Japanese Translation No. 62-500034 of the PCT Application discloses a softened composition comprising a dicyclopentadiene-modified unsaturated polyester alkyd, a urethane oligomer and a non-resinous vinyl monomer. As an example of producing the dicyclopentadiene-modified unsaturated polyester alkyd, the publication discloses a process for adding water more than a theoretical equivalent amount relative to the amount of maleic anhydride to prepare a reaction mixture, adding dicyclopentadiene to react with the reaction mixture, and reacting the reaction product with polyol.

In general, the dicyclopentadiene-modified unsaturated polyester is obtained by producing a dicyclopentenyl monoester of maleic acid in an addition reaction step of dicyclopentadiene, maleic anhydride and water, and esterifying the addition reaction mixture including the dicyclopentenyl monoester with a polyhydric alcohol, or a polyhydric alcohol and a polybasic acid.

In the above addition reaction step, first, maleic anhydride reacts with water to form maleic acid. Then an addition reaction between dicyclopentadiene and one of carboxylic acid of the maleic acid molecule is conducted in the absence of a catalyst due to the high dissociation degree of the carboxylic acid, to produce a dicyclopentenyl monoester as an addition reaction product. Since such a reaction causes a drastic heat generation, it is required to pay close attention in order to prevent the generated heat from accelerating further reaction (Hereinafter, the accelerated exothermic reaction is referred to as "a reckless exothemic reaction".)

According to a conventional process described above, however, when maleic anhydride, water and dicyclopentadiene are previously mixed and heated in a reaction vessel, the reaction proceeds rapidly and the pressure in the reaction vessel increases rapidly by a rapid increase in temperature due to the reckless exothermic reaction. This pressure increase may cause such a dangerous problem as breakage of the reaction vessel. To avoid the above problem, when the above reaction is conducted, a reaction vessel with a sufficient cooling capability must be used to avoid the above problem. However, such a reaction vessel generally has a large size and thereby causes an increase in cost.

In addition, the conventional process includes an addition reaction conducted by adding dropwise water or maleic anhydride to a mixture of maleic anhydride and dicyclopentadiene or a mixture of water and dicyclopentadiene. In this process, since the mixture of maleic acid and dicyclopentadiene as well as water and dicyclopentadine do not dissolve each other, the reaction system is likely to be inhomogeneous in which concentration distributions of the respective raw materials are partially inhomogeneous. Thus, it is hard to control the reaction heat and the reckless reaction is liable to be caused by the reaction heat, resulting in a poor operation safety on production of the unsaturated polyester. To avoid such a reckless reaction, the cooling capability of an equipment may be enhanced, which increases the equipment cost.

To prevent the problem of the reckless reaction in the above conventional process, water or maleic anhydride may be added dropwise with the above mixture being stirred continuously and sufficiently. However, this process takes much time and/or trouble to conduct the continuous stirring step.

A process for gradually adding dicyclopentadiene to maleic acid in the above conventional process is also suggested. To smoothly react them in a homogeneous liquid state, maleic acid must be melted by heating to a temperature of higher than 140° C., which is higher than its melting point (138–139° C.). However, dicyclopentadiene added at such a high temperature is likely to be thermally decomposed to produce cyclopentadiene, and then the cyclopentadiene reacts with maleic acid to produce 5-norborene-2,3-dicarboxylic acid as by-product. Therefore, the reaction at a temperature of higher than 140° C. decreases the yield of a dicyclopentenyl mono ester of maleic acid, resulting in a decreased yield of the desired dicyclopentadiene-modified unsaturated polyester and a lowered modified characteristics.

Furthermore, the conventional process for dicyclopentadiene-modified unsaturated polyester is conducted in the inhomogeneous reaction system as described above, in which an inhomogeneous distribution of reaction heat is generated. Even if the stirring is sufficiently conducted during the reaction, the reaction system cannot be inevitable to have not a little portion having a temperature of higher than 140° C. due to the inhomogeneous reaction heat. As a result, the above by-product is liable to be formed at the high temperature portion and incorporated into a structure of the modified unsaturated polyester.

Therefore, the conventional dicyclopentadiene-modified unsaturated polyester obtained by the process described above may not provide sufficiently enhanced characteristics by the modification, e.g., hot water resistance, stability and the like, to a molded article obtained by the molding material using a resin composition containing the conventional dicyclopentadiene-modified unsaturated polyester.

As described above, according to the prior art, various studies have been made for improving handling of an unsaturated polyester by using dicyclopentadiene as a modified component and for improving the moldability of the molding material by mixing a modified unsaturated polyester with a polymerizable monomer to form the molding material. However, it is hard to say that a sufficient study has been made on the effects of a specific ratio of dicyclopentadiene, maleic anhydride and water used as raw materials on production of the dicyclopentadiene-modified unsaturated polyester, particularly the effects on the smoothness of the reaction to produce the modified unsaturated polyester and modified characteristics of the resulting modified unsaturated polyester as well as molding material containing the same. Therefore, there has been a demand for a further specific modifying technique.

The present invention has been accomplished in order to establish a specific modifying technique. An object of the present invention is to provide a process capable of securely producing a dicyclopentadiene-modified unsaturated polyester, which provides an excellent stability to the dicyclopentadiene-modified unsaturated polyester resin composition (i.e., the composition is stable and stored without being polymerized as time passes) and an excellent hot water resistance to the obtained molded article, in a markedly stable and economic manner. A further object of the present invention is to provide a resin composition and a molding material each containing the above unsaturated polyester.

SUMMARY OF THE INVENTION

The present invention provides a process capable of producing a dicyclopentadiene-modified unsaturated polyester, which gives a molded article excellent performances, in an industrially efficient and safe manner by using the dicyclopentadiene-modified unsaturated polyester as a main component of a molding material.

According to an aspect of the present invention, a process includes a first step of reacting a reaction mixture of maleic anhydride (MA) and water ($H_2O$) with dicyclopentadiene (DCPD), and a second step of reacting the reaction product obtained in the first step with a polyhydric alcohol, or a polyhydric alcohol and a polybasic acid, to obtain an unsaturated polyester modified with dicyclopentadiene. In the process, (1) a molar ratio ($H_2O$/DCPD) of water to dicyclopentadiene used in the first step is greater than 1 and a molar ratio (MA/DCPD) of maleic anhydride to dicyclopentadiene is 1.2 or more; or (2) a molar ratio ($H_2O$/MA) of water to maleic anhydride used in the first step is 1 or less; or (3) a molar ratio ($H_2O$/DCPD) of water to dicyclopentadiene used in the first step is greater than 1 and a molar ratio (MA/DCPD) of maleic anhydride to dicyclopentadiene is 1.2 or more and, furthermore, a molar ratio ($H_2O$/MA) of water to maleic anhydride is 1 or less.

The dicyclopentadiene-modified unsaturated polyester according to the present invention is produced by the above process. The molar ratio (DCPD/MA) of dicyclopentadiene (DCPD) used in the first step to maleic acid used in the above process is preferably 0.2 to 0.6. The maleic acid of this ratio means the maleic anhydride used in the first step or, if maleic acid is used as a polybasic acid in the second step, the total of maleic anhydride used in the first step and maleic acid used in the second step. And the dicyclopentadiene-modified unsaturated polyester preferably has 20% by weight or more of dicyclopentadiene. A weight-average molecular weight of the dicyclopentadiene-modified unsaturated polyester on use for a molding material is preferably 8,000 or more and a ratio of weight-average molecular weight to number-average molecular weight (weight-average molecular weight/number-average molecular weight) is preferably 5 to 50. The acid value of the polyester is preferably 15 to 40.

According to another aspect of the present invention, a dicyclopentadiene-modified unsaturated polyester resin composition is provided by mixing the dicyclopentadiene-modified unsaturated polyester with the radically polymerizable monomer, preferably 2 to 300 parts by weight of the other radically polymerizable monomer such as styrene per 100 parts by weight of the polyester. A molding material containing the above polyester resin composition is also provided. The molding material may contain a reinforcing fiber holding the resin composition. The rein composition and molding material can give excellent performances described below to the resulting molded article.

DETAILED DESCRIPTION OF THE PREFERRED EMBODIMENTS OF THE INVENTION

The present invention provides a process capable of safely and efficiently producing a dicyclopentadiene-modified unsaturated polyester, which exhibits particularly excellent characteristics for molding materials. The process includes the first step of reacting a reaction mixture of maleic anhydride and water with dicyclopentadiene, as shown in the following general scheme (I):

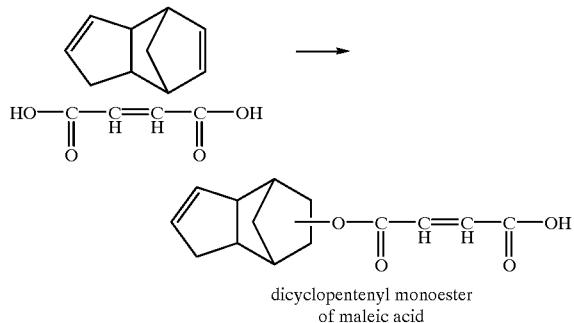

dicyclopentenyl monoester of maleic acid in combination with the second step of reacting the reaction product obtained in the first step with a polyhydric alcohol, or a polyhydric alcohol and a polybasic acid, to obtain a dicyclopentadiene-modified unsaturated polyester. These steps are characterized by defining any one condition shown in the following (1) to (3):

(1) a molar ratio ($H_2O$/DCPD) of water to dicyclopentadiene used in the first step is adjusted to greater than 1 and a molar ratio (MA/DCPD) of maleic anhydride to dicyclopentadiene is adjusted to 1.2 or more;

(2) a molar ratio ($H_2O$/MA) of water to maleic anhydride used in the first step is adjusted to 1 or less, preferably less than 1; and (3) a molar ratio ($H_2O$/DCPD) of water to dicyclopentadiene used in the first step is adjusted to greater than 1 and a molar ratio (MA/DCPD) of maleic anhydride to dicyclopentadiene is adjusted to 1.2 or more and, furthermore, a molar ratio ($H_2O$/MA) of water to maleic anhydride is adjusted to 1 or less.

Preferable amount of dicyclopentadiene to be added in the first step is adjusted so that the 20% by weight or more of dicyclopentadiene to the modified unsaturated polyester is used in the production of the modified unsaturated polyester.

According to the condition of (1), the molar ratio ($H_2O$/DCPD) of water to dicyclopentadiene in the first step is greater than 1 (preferably 1.2 or more) and the molar ratio (MA/DCPD) of maleic anhydride to dicyclopentadiene is 1.2 or more (preferably 1.5 or more), thereby proceeding the reaction between dicyclopentadiene and maleic acid in the first step efficiently and smoothly.

The first feature of the condition (1) is that the molar ratio ($H_2O$/DCPD) of water to dicyclopentadiene used in the first step is set to a value exceeding 1 for the purpose of using maleic anhydride in an excess amount (at least 20 mol%) relative to the amount of dicyclopentadiene. When the molar ratio is 1 or less, the reaction system of the first step lacks water and, therefore, a large amount of maleic anhydride is remained as it is, i.e., without reacting with water into maleic acid.

In the reaction system of the first step, as shown in the above general scheme (I), maleic anhydride does not react with dicyclopentadiene unless maleic anhydride reacts with water into a free acid (i.e., maleic acid). Maleic anhydride that is remained in the reaction system due to lack of water does not react with dicyclopentadiene. As a result, the remaining dicyclopentadiene forms by-product in the reaction system. Such by-product is likely to decrease the stability of the resulting modified unsaturated polyester resin composition having the modified unsaturated polyester and a polymerizable monomer, resulting in a poor stability of the molding material having the polyester resin composition (i.e., the molding material are easier to be polymerized) described below as well as a low hot water resistance of the molded article obtained from the molding material.

The by-product produced in the reaction system causes a phenomenon in which the viscosity exceeds a desired range before the acid value of the mixture that is being esterified in the second step reaches a desired value. In some case, the by-product is likely to cause formation of a gel in the system or gelation of the entire system.

Moreover, the increase of the amount of the residual carboxyl and/or hydroxyl groups in the esterified mixture deteriorates the stability of the modified unsaturated polyester resin composition containing the polyester as well as the molding material containing the resin composition, and furthermore the hot water resistance of the molded article obtained by curing the molding material.

Accordingly, in order to form a half-ester of maleic acid (shown in scheme (I)) with preventing formation of the dicyclopentadiene secondary reaction product in the first step, it is a very important to use more than the equimolar amount of water, preferably 20 mol % or more, relative to the amount of dicyclopentadiene, and form maleic acid (free acid compound prepared by reacting maleic anhydride with water) in an equimolar amount or more relative to the amount of dicyclopentadiene in the presence of water, to thereby allow substantially all dicyclopentadiene in the reaction system to react as shown in the above scheme (I).

Also, the second feature of the condition (1) that the molar ratio (MA/DCPD) of maleic anhydride to dicyclopentadiene used in the first step to 1.2 or more, preferably 1.5 or more, is an important requirement to react substantially all dicyclopentadiene in the reaction system as shown in the above scheme (I), to thereby prevent forming of the dicyclopentadiene secondary reaction product in the reaction system.

It has been considered that, in order to react dicyclopentadiene with maleic anhydride, water is used in an equimolar amount relative to the amount of dicyclopentadiene, thereby to form maleic acid in an equimolar amount or more relative to the amount of dicyclopentadiene. With respect to this, the present inventors have intensively studied and confirmed as follows. Even if maleic acid can be obtained in a slightly excess amount relative to the amount of dicyclopentadiene, formation of the dicyclopentadiene secondary reaction product can not be prevented completely. Thus, it is essential to use maleic acid in a comparatively excess amount. Specifically, in the case where water exists in an equimolar amount or more relative to the amount of dicyclopentadiene, if the molar ratio (MA/DCPD) of maleic anhydride to dicyclopentadiene is not more than 1.2 or more (or 1.5 or more), dicyclopentadiene and maleic acid may not reacted efficiently in the first step and a part of the dicyclopentadiene is likely to form a secondary reaction product causing problems described above.

Therefore, in the present invention under the condition (1), it may be required that the molar ratio ($H_2O$/DCPD) of water to dicyclopentadiene used in the first step is adjusted to 1.2 or more, preferably 1.5 or more, and the molar ratio (MA/DCPD) of maleic anhydride to dicyclopentadiene is adjusted to 1.2 or more (preferably 1.5 or more).

Next, in the present invention under the condition (2), it is important that the molar ratio ($H_2O$/MA) of water to maleic anhydride in the first step is 1 or less, and preferably less than 1.

When the molar ratio is 1 or less, the maleic anhydride can remain undissociated in the reaction system of the first step. As described above, by adjusting or controlling the amount of the residual maleic anhydride, deposition of a solid in the reaction system of the first step can be suppressed, thereby allowing the reaction system of the first step to be proceeded in a homogeneous system with maintaining it a liquid state. As a result, prevented can be a reckless exothermic reaction, which is liable to be caused when the reaction system of the first step proceeds in an heterogeneous system due to deposition of the solid, as well as formation of the by-product due to a local rise in temperature. Therefore, it is possible to produce a maleic acid dicyclopentenyl monoester in a safe and efficient manner by adding dicyclopentadiene efficiently to maleic acid (i.e., water adduct of maleic anhydride).

As described above, according to the feature of the condition (2), since maleic anhydride can effectively remain in the reaction mixture by suppressing the amount of water in the first step to a theoretical equivalent amount or less relative to the amount of maleic anhydride, the reaction mixture hardly has a solid deposited and maintain its almost homogeneous liquid state, thereby preventing localization of the components to be used for the reaction in the first step. Subsequently, by gradually adding dicyclopentadiene to the reaction mixture, a reaction product containing a dicyclopentenyl monoester of maleic acid can be obtained in a safe and efficient manner. This is because the gradual adding maintains the reaction mixture in an almost homogeneous liquid state and prevents a reckless exothermic reaction and formation of by-product, which are liable to be caused by the heterogeneous reaction.

In this process, the added dicyclopentadiene rapidly reacts with maleic acid to produce a dicyclopentenyl monoester of maleic acid because the reaction system is homogeneous, thereby preventing the production of dicyclopentadiene secondary reaction product in the above reaction system.

More preferred molar ratio of water to maleic anhydride in the process is 0.2 to 1.0. When the molar ratio is greater than 1.0, deteriorated is the hot water resistance of the resulting molded article using the molding material containing the obtained modified unsaturated polyester. The reason is considered that the secondary reaction products, which is produced in the case where more than the theoretical equivalent amount of water relative to the amount of maleic anhydride is used, is likely to decrease the hot water resistance.

In addition, in the case where more than the theoretical equivalent amount of water relative to the amount of maleic anhydride is used, the reaction mixture of maleic anhydride and water is converted into a heterogeneous suspension containing a solid and the solid is likely to cause disadvantages such as clogging of a reaction discharge port of a reaction vessel and adhering to a thermometer of the reaction vessel to thereby prevent the thermometer from indicating an accurate temperature. Furthermore, as the amount of water is excessively larger, the amount of the solid contained in the reaction mixture increases. As a result, the reaction mixture cannot be sufficiently stirred, to thereby impair the safety during the reaction.

On the contrary, when the molar ratio of water to maleic anhydride is smaller than 0.2, the dicyclopentadiene-modified unsaturated polyester has a decreased content of dicyclopentenyl groups of a dicyclopentadiene residue. In this case, the hot water resistance of the resulting molding material using the dicyclopentadiene-modified unsaturated polyester cannot be improved.

Accordingly, in order to provide an excellent hot water resistance to molding material, the molar ratio of water to maleic anhydride should be set to 1.0 or less (preferably smaller than 1.0, and more preferably 0.9 or less) and preferably 0.2 or more.

The condition (3) has both of the features of the conditions (1) and (2), wherein the molar ratio of water to dicyclopentadiene ($H_2O$/DCPD) used in the first step is greater than 1 (preferably 1.2 or more) and the molar ratio of maleic anhydride to dicyclopentadiene (MA/DCPD) is 1.2 or more (preferably 1.5 or more) and, furthermore, the molar ratio of water to maleic anhydride ($H_2O$/MA) is 1 or less (preferably less than 1). The reason for the features of numerical limitations is that, as above described about the conditions (1) and (2), these features make it possible to proceed the reaction in the first step in a more smooth and efficient manner.

In the present invention, the reaction between maleic anhydride and water is preferably conducted at a temperature of 100° C. to 140° C., preferably 120° C. to 130° C., so as to inhibit the deposition of a solid on the reaction. When the reaction temperature is lower than 100° C., the amount of the deposited solid undesirably increases. On the other hand, when the temperature exceeds 140° C., maleic acid is liable to convert into fumaric acid having a poor solubility with water and the amount of the deposited solid undesirably increases because of the poor solubility of fumaric acid.

Since the reaction between maleic anhydride and water proceeds rapidly, dicyclopentadiene can be mixed with the reaction mixture in which maleic anhydride and water are entirely mixed immediately after the temperature of the reaction mixture reaches a temperature within the above preferred range.

The process for reaction between maleic anhydride and water may include any process of:
  (a) heating after mixing maleic anhydride and water;
  (b) heating water previously and adding maleic anhydride; and (c) heating maleic anhydride previously and adding water. In view of controlling the reaction heat and suppressing the amount of the deposited solid, there can be preferably employed the process of heating maleic anhydride to the temperature within a range from 100 to 140° C., preferably from 120 to 130° C., and then adding dropwise water (i.e., process (c)).

It is also possible to replace a part of maleic anhydride with maleic acid. In this case, preferable molar amount of maleic acid is equal to or less than that of the replaced maleic anhydride. This is because, when the amount of maleic acid exceeds the equimolar amount with the replaced maleic anhydride, the reaction mixture of maleic anhydride, maleic acid and water may be in a heterogeneous state containing the solid deposit.

To react the reaction mixture of maleic anhydride and water with dicyclopentadiene, preferable reaction temperature is 100° C. to 140° C., preferably 120° C. to 130° C., so as to inhibit the deposition of the solid in the mixture. When the reaction temperature is lower than 100° C., the amount of the solid deposit increases to thereby prevent the reaction from being conducted in the homogeneous reaction system. On the other hand, when the temperature exceeds 140° C., maleic acid is converted into fumaric acid having a poor solubility, resulting in deposition of a solid of the secondary reaction product of fumaric acid. Also, dicyclopentadiene is liable to be decomposed into cyclopentadiene. As a result, the production efficiency of the desired substance is likely to be lowered.

The amount of dicyclopentadiene should be satisfy the following conditions, as above described regarding the condition (1):

[molar amount of dicyclopentadiene≦molar amount of water], where only maleic anhydride is used as a raw material of maleic acid; or

[molar amount of dicyclopentadiene≦(molar amount of water and molar amount of maleic acid)], where a portion of maleic anhydride is replaced with maleic acid.

Furthermore, the amount of dicyclopentadiene used in the production of the dicyclopentadiene-modified unsaturated polyester is preferably 20% by weight to 51% by weight.

When the molar amount of dicyclopentadiene is larger than that of water (when using only maleic anhydride) or total molar amount of water and maleic acid (when using maleic acid in addition to maleic anhydride), the molded article obtained by using the resulting dicyclopentadiene-modified unsaturated polyester may have a poor hot water resistance.

After the completion of the first step, an esterification reaction is conducted in the second step by adding a polyhydric alcohol, or a polyhydric alcohol and a polybasic acid to the reaction product containing the dicyclopentenyl monoester of maleic acid. In this step, for example, the reaction product is esterified at a reaction temperature of 160 to 230° C. until the acid value of the product being esterified reaches 40 or less with removing condensed water produced by the esterification, to obtain a dicyclopentadiene-modified unsaturated polyester.

The amount of the polyhydric alcohol, or the amount of the polyhydric alcohol and polybasic acid used in the second step is arbitrary adjusted according to the desired viscosity of the resulting dicyclopentadiene-modified unsaturated polyester. For example, the amount of the polyhydric alcohol is adjusted so that the amount of hydroxyl groups in the polyhydric alcohol is equimolar with the total amount of carboxyl groups including those contained in the reaction mixture in the first step (including unreacted maleic anhydride) and those of the polybasic acid added in the second step (i.e., the amount of hydroxyl groups=the amount of carboxyl groups).

To obtain the dicyclopentadiene-modified unsaturated polyester having an excellent hot water resistance, it is more advantageous to use a large amount of dicyclopentadiene. Therefore, the amount of the raw material used in the second step is preferably decreased so that the amount of dicyclopentadiene is 20% by weight or more.

The polyhydric alcohol used in the second step includes, for example, ethylene glycol, diethylene glycol, 1,3-propanediol, 2-methyl-1,3-propanediol, 1,4-butanediol, 1,3-butanediol, 2,3-butanediol, dipropylene glycol, 1,5-pentanediol, 1,6-hexanediol, 2,2-dimethyl-1,3-propanediol, 2-ethyl-1,4-butanediol, 1,7-heptanediol, 1,8-octanediol, 1,9-nonanediol, 1,10-decanediol, 1,4-cyclohexanediol, 1,4-dimethylolcyclohexane, 2,2-diethyl-1,3-propanediol, 3-methyl-1,4-pentanediol, 2,2-diethyl-1,3-butanediol, 4,5-nonanediol, triethylene glycol, tetraethylene glycol, glycerin, trimethylolpropane, pentaerythritol, dipentaerythritol, hydrogenated bisphenol A, alkylene oxide adduct of hydrogenated bisphenol A, and alkylene oxide adduct of bisphenol A. An epoxy compound, which is a precursor of the polyhydric alcohol, may also be used as the polyhydric alcohol, and examples thereof include ethylene oxide, propylene oxide, styrene oxide, glycidyl (meth) acrylate, allyl glycidyl ether and the like. These polyhydric alcohols can be used alone, or two or more kinds of them may also be used in combination.

The polybasic acid includes, for example, unsaturated polybasic acid such as maleic acid, fumaric acid, aconitic acid and itaconic acid; aliphatic saturated polybasic acid such as malonic acid, succinic acid, methylsuccinic acid, 2,2-dimethylsuccinic acid, 2,3-dimethylsuccinic acid, hexylsuccinic acid, glutaric acid, 2-methylglutaric acid, 3-methylglutaric acid, 2,2-dimethylglutaric acid, 3,3-dimethylglutaric acid, 3,3-diethylglutaric acid, adipic acid, pimelic acid, suberic acid, azelaic acid and sebacic acid; aromatic saturated polyhydric acid such as phthalic acid, isophthalic acid, terephthalic acid, trimellitic acid, pyromellitic acid and 2,6-naphthalenedicarboxylic acid; alicyclic saturated polybasic acid such as nadic acid, 1,2-hexahydrophthalic acid, tetrahydrophthalic acid and 1,4-cyclohexanedicarboxylic acid; and anhydrides of these acids. These polybasic acids can be used alone, or two or more kinds of them can be used in combination.

In the first and second steps, the reactions are preferably conducted in the presence of an inert gas such as nitrogen gas so as to inhibit the reaction product from coloring. Also, the reactions are preferably conducted under a normal pressure of 1 atm, or under a pressure of higher than 1 atm.

In the production of the dicyclopentadiene-modified unsaturated polyester (second step), preferable molar ratio (DCPD/MA) of dicyclopentadiene (DCPD) to maleic acid (MA) is 0.2 to 0.6 and preferable amount of dicyclopentadiene is 20% by weight or more to the resulting polyester. It should be appreciated that the maleic acid MA may be maleic acid or its anhydride used in the first step, or the sum of the maleic acid or its anhydride used in the first step plus maleic acid or its anhydride used in the second step in the case where maleic acid or its anhydride is used as the polybasic acid in the second step.

When the molar ratio (DCPD/MA) is smaller than 0.2, the dicyclopentadiene may not satisfactory modify characteristics, particularly hot water resistance, of unsaturated polyester. On the other hand, when the molar ratio exceeds 0.6, the molecular weight of the whole unsaturated polyester decreases by an increased mole number of added dicyclopentadiene, resulting in a poor handling due to the excessively low viscosity of the obtained unsaturated polyester, and poor physical properties of the cured article of the polyester. In addition, on using as a molding material such as SMC and BMC, the molding material is likely to cause separation with the sub-material due to its low thickening property, or poor appearance of the obtained molded article due to its poor reactivity.

Considering these advantages and disadvantages, preferable lower limit of the molar ratio (DCPD/MA) is 0.3, while preferable upper limit of the molar ratio is 0.5.

The amount of dicyclopentadiene is preferably 20% by weight or more, and more preferably 25% by weight or more, so as to utilize the effect of the modification with dicyclopentadiene effectively. When the amount of dicyclopentadiene is smaller than 20% by weight, the above-described modification effect of the with dicyclopentadiene, particularly hot water resistance, cannot be obtained sufficiently. In addition, the resulting molded article has an increased water absorption coefficient, to thereby have a poor water resistance. The upper limit of the amount of dicyclopentadiene is not specifically limited, but is preferably 45% by weight or less, and more preferably 35% by weight or less, because the use of an excessively large amount of dicyclopentadiene provides not only a low viscosity but also poor strength characteristics to the resulting modified product.

In the method of producing the dicyclopentadiene-modified unsaturated polyester according to the present invention, the molar ratio (DCPD/MA) of dicyclopentadiene (DCPD) to maleic acid (MA) is preferably within a range from 0.2 to 0.6 and the amount of dicyclopentadiene is preferably 20% by weight or more, as described above. Preferred physical properties, in case where the dicyclopentadiene-modified unsaturated polyester obtained by the above method is used practically as the molding material such as SMC, BMC, etc., include the followings.

The weight-average molecular weight of the modified unsaturated polyester is preferably 8,000 or more, and more preferably 10,000 or more. The ratio of weight-average molecular weight to number-average molecular weight (weight-average molecular weight/number-average molecular weight) is preferably 5 to 50, and more preferably 10 to 30. When the polyester has a low weight-average molecular weight of 8,000 or less, it is difficult to be handled due to the low viscosity. Also, the cured molded article made from the polyester cannot be improved in physical properties and heat resistance. When the polyester has a ratio of weight-average molecular weight to umber-average molecular weight of smaller than 5, it is likely to provide a poor thickening property to the resulting molding material such as SMC and BMC and therefore the resulting SMC or BMC after being thickened may have a high stickiness to cause handling problems. Moreover, the modified unsaturated polyester resin composition is liable to be separated from the sub-material described below in the SMC or BMC. On the other hand, when the ratio of the polyester is higher than 50, the resulting SMC or BMC is likely to have an excessively high viscosity to cause a poor wet, or to lower the flowability of the SMC or BMC to thereby cause molding problems such as a pre-gelation and short shot.

Furthermore, the unsaturated polyester preferably has an acid value (AV) of 15 to 40. When the acid value of the polyester is excessively small, the resulting molding material (e.g. SMC) is likely to have a poor thickening property to cause handling problems. In severe case, in the molding material, the polyester may separate with the sub-material.

On the contrary, when the polyester has an excessively large acid value and it is used for SMC and BMC, the initial compound to be impregnated to reinforced glass fibers is likely to be thickened rapidly, that is, to have a poor impregnation to the reinforced glass fibers. As a result, the resulting molded article may have defects such as blister and void which is formed along to the glass fiber (hereinafter, referred to as "glass grain pattern"). More preferable lower limit of the acid value is 20, while more preferable upper limit is 30.

When the dicyclopentadiene-modified unsaturated polyester is used for a molding material, the polyester is usually mixed with a radically polymerizable monomer and a polymerization initiator so that the viscosity or curing time of the molding material is suitable for the molding operation.

100 Parts by weight of the modified unsaturated polyester is usually mixed with 2 to 300 parts by weight of the radically polymerizable monomer, to prepare a modified unsaturated polyester resin composition. Then, the resin composition is cured by mixing a curing agent and an accelerator, as described below, to obtain a molded article or coated film. That is, a molded article can be obtained by preparing a molding material containing the polyester and monomer (i.e., the resin composition) as main components, and reacting the polyester with the monomer to cure. To prepare SMC or BMC as the molding material, the resin composition is further mixed with reinforcing fibers and the mixture is formed into a sheet or bulk. In the present invention, by using the dicyclopentadiene-modified polyester having the above characteristics to prepare such molding materials, it is suppressed that the by-product of dicyclopentadiene, which is produced by the reaction in a conventional heterogeneous system, incorporates into the unsaturated polyester structure. This prevents a decrease of hot water resistance of the molded article which is caused by the by-product, and therefore a molded article having an excellent hot water resistance can be produced from the molding material of the present invention.

As the radically polymerizable monomer, there can be used known radically polymerizable monomers used for unsaturated polyester and epoxy (meth)acrylate. Examples thereof include styrenic monomer such as styrene, vinyltoluene, p-t-butylstyrene, α-methylstyrene, p-chlorostyrene, p-methylstyrene, p-chloromethylstyrene and divinylbenzene; (meth)acrylic monomer such as (meth)acrylic acid, methyl (meth)acrylate, ethyl (meth)acrylate, propyl (meth)acrylate, butyl (meth)acrylate, 2-ethylhexyl (meth)acrylate, cyclohexyl (meth)acrylate, 2-hydroxyethyl (meth)acrylate, 2-hydroxypropyl (meth)acrylate, glycidyl (meth)acrylate, ethylene glycol di(meth)acrylate, diethylene glycol di(meth)acrylate, ester of alkylene oxide adduct of bisphenol A and (meth)acrylic acid, trimethylolpropane tri (meth)acrylate, trimethylolethane tri(meth)acrylate, glycerin tri(meth)acrylate, pentaerythritol tetra(meth)acrylate and dipentaerythritol hexa(meth)acrylate; and allyl ester monomer such as diallyl phthalate and diallyl isophthalate. These radically polymerizable monomers can be used alone, or two or more kinds of them can be used in combination.

The amount of the radically polymerizable monomer is generally 2 to 300 parts by weight, and more generally 30 to 200 parts by weight, based on 100 parts by weight of the dicyclopentadiene-modified unsaturated polyester.

As the polymerization initiator, there can be used known polymerization initiators used for unsaturated polyester and epoxy (meth)acrylate. Examples thereof include phenothiazines such as 1,4-benzoquinone, phenothiazine and methoxyphenothiazine; hydroquinones such as hydroquinone, methylhydroquinone, trimethylhydroquinone, mono-t-butylhydroquinone and p-t-butylcatechol; phenols such as methoxyphenol, butyrated hydroxytoluene and phenol; quinones such as benzoquinone and naphthloquinone; nitro compounds such as nitrophenol; halides of organoonium such as benzyltriethyl ammonium chloride, benzyltriphenyl phosphonium chloride and trimethyl sulfonium iodide; and organophosphites such as triphenyl phosphite and monophenyl phosphite. These polymerization initiators can be used alone, or two or more kinds of them can be used in combination.

As the curing agent, accelerator and auxiliary accelerator, there can be used any known curing agents, accelerators and auxiliary accelerators used for unsaturated polyester resin and epoxy (meth)acrylate resin (also referred to as a vinyl ester resin).

The curing agent includes, for example, ketone peroxide such as methylethylketone peroxide and acetylacetone peroxide; hydroperoxide such as cumene hydroperoxide; diacyl peroxide such as benzoyl peroxide; dialkyl peroxide such as dicumyl peroxide and t-butylcumyl peroxide; alkyl perester such as t-butylperoxy-2-ethyl hexanoate, t-butylperoxy benzoate, t-amylperoxy benzoate and t-hexylperoxy benzoate; percarbonate such as bis(4-t-butylcyclohexyl)peroxy dicarbonate; and azo compound such as 2,2'-azobisisobutyronitrile and 2,2'-azobis-2-methylbutyronitrile. These curing agents can be used alone, or two or more kinds of them can be used in combination.

The accelerator includes, for example, metal soap such as cobalt octylate and manganese octylate; metal chlete compound such as cobalt acetylacetonate and vanadium acetylacetonate; and amine compound such as dimethylaniline. These accelerators can be used alone, or two or more kinds of them can be used in combination.

The auxiliary accelerator is used for enhancing the potency of the accelerator and includes, for example, acetylacetone, ethyl acetoacetate, anilide acetoacetate, etc. These auxiliary accelerators can be used alone, or two or more kinds of them can be used in combination.

If necessary, the molding material further includes thickeners, low profile additives, fillers, releasants, reinforcing fibers and colorants.

The thickener may be a compound capable of reacting with a carboxylic acid or hydroxyl group contained in the unsaturated polyester, and specific examples thereof include polyfunctional isocyanate; polyvalent metal oxide such as magnesium oxide, calcium oxide and zinc oxide; polyvalent metal hydroxide such as magnesium hydroxide and calcium hydroxide; and polyisocyanate compound such as tolylene diisocyanate, methaxylylene diisocyanate and diphenylmethane diisocyanate. These thickeners can be used alone, or two or more kinds of them can be used in combination.

The amount of these thickeners can be determined according to the weight-average molecular weight and viscosity of the modified unsaturated polyester. In stead of using these thickener, physical thickening can also be conducted by using a polymer having crystallizability at an ordinary temperature.

The low profile additive includes, for example, thermoplastic polymer and copolymer such as polystyrene, methyl polymethacrylate, polyethylene, polypropylene, saturated polyester, polyamide, polyurethane and polyvinyl acetate; and three-dimensional polymer having a low degree of closslinking. These low profile additives can be used alone, or two or more kinds of them can be used in combination. The amount of the low profile additive is not specifically limited, but is usually 100 parts by weight or less based on 100 parts by weight of the modified unsaturated polyester.

The filler includes, for example, calcium carbonate, aluminum hydroxide, clay, talc, silica sand, broken stone, antimony oxide, etc, but not limited thereto. These fillers can be used alone, or two or more kinds of them can be used in combination.

The releasant includes, for example, fatty acid such as stearic acid, palmitic acid, etc., or metal salts thereof. These releasants can be used alone, or two or more kinds of them can be used in combination. The amount is not specifically limited, and can be determined according to properties of the releasant and molding conditions of the molding material.

As the reinforcing fiber, for example, inorganic fiber such as glass fiber and carbon fiber; and organic fiber such as polyester fiber and polyamide fiber made of straight-chain aliphatic polyamide or aromatic polyamide. The amount may be determined according to the characteristics required to the molded article, molding conditions, fiber length, fiber diameter and numbers of fibers forming a bunch thereof. When used is a reinforcing fiber having a length of 1/8 to 2 inch, the amount of the reinforcing fiber is generally 5 to 35% by weight.

Furthermore, it is also effective to use the other thermosetting resin components in combination with the dicyclopentadiene-modified unsaturated polyester of the present invention to prepare a molding material. The other thermosetting resin components include, for example, unsaturated polyester other than dicyclopentadiene-modified unsaturated polyester, epoxy (meth)acrylate, urethane (meth)acrylate, polyester (meth)acrylate and polyol (meth)acrylate.

As above described, the present invention is constructed as described above and can provide a dicyclopentadiene-modified unsaturated polyester, which has a high safety, high economic efficiency and good handling because of its low viscosity, and gives an excellent heat resistance and stability to the resulting molded article, and a process for producing the same. The present invention can also provide a resin composition and a molding material both including the above polyester. The resin composition and molding material have a good stability and excellent characteristics particularly suitable for a SMC or BMC and are capable of giving an excellent hot water resistance to the resulting molded article. Accordingly, such a molding material can be utilized in various purposes such as fiber-reinforced plastics, casting materials, resin concretes, lining materials, sheet molding materials (SMC) and bulk molding materials (BMC). Particularly, the molding material can be effectively used as SMC and BMC.

EXAMPLES

The examples of the present invention will be illustrated but the present invention is not limited to the following examples, and modifications can be made without departing from the purports described hereinabove and hereinafter and are also included in the technical scope of the present invention. In the following examples, "percentages" and "parts" are by weight unless otherwise stated.

In the production of the modified unsaturated polyester shown in the following examples, measured were the acid value for judging whether the esterified reaction is completed or not, viscosity of the respective modified unsaturated polyesters, stability of the respective polyester resin compositions for the molding material, and boiling resistance of the respective molded articles which represents the hot water resistance. The measuring procedures were as follows.

[Acid Value]

Acid value on the completion of esterification in the second step: It is represented by the amount (mg) of potassium hydroxide required to neutralize 1 g of a sample that is an esterified product after the second step (solvent: acetone/methanol=7/3). In the measurement of the acid value, a 0.1N ethanol solution of potassium hydroxide was used as a titrant.

[Stability of Modified Unsaturated Polyester Resin Composition]

To 60 parts by weight of a dicyclopentadiene-modified unsaturated polyester, 40 parts by weight of styrene was added and then hydroquinone as a polymerization inhibitor was added so that a concentration thereof is 150 ppm based on the total amount. After being mixed homogeneously, the mixture was maintained at 40° C. to observe a change of the mixture as time passed. The stability was evaluated by whether or not a gel was formed in the mixture due to the polymerization. That is, in the case where a gel was formed (represented as "×" in Table 1), the resin composition was evaluated to have a poor stability, while in the case where no gel was formed (represented as "○"), the resin composition was evaluated to have a good stability.

[Hot Water Resistance of Molded Article]

A test piece of the respective molded articles made from the respective polyester resin compositions, which was prepared in the following procedure, was dipped in boiling water and observed the appearance of the test piece every predetermined time period. The hot water resistance was evaluated by the time until cracks were generated in the test piece.

The procedure for making the test piece was as follows. First, 0.6 g of cobalt octylate (corresponding to 8% by weight of metal) and 3.0 g of a methyl ethyl ketone peroxide solution having a purity of 55% were added to 300 g of the respective modified unsaturated polyester resin compositions obtained in the following test examples. The mixture was poured into a casting mold made of glass and allowed to stand overnight. Then, the mixture was cured by heating at 110° C. for 2 hours and then removed from the mold, to obtain a cured article in size of 3 mm×300 mm×270 mm. The cured article was cut into pieces in size of 3 mm×75 mm×25 mm, each of which was used as the above-described test piece.

In a reaction vessel equipped with a reflux condenser, a nitrogen introducing tube, a stirrer, a thermometer and a dropping device, 441 g (4.5 mol) of maleic anhydride was heated to 120° C., followed by adding 54 g (3 mol) of water from the dropping device over 10 minutes with the mixture maintaining a temperature of 120 to 130° C. The obtained reaction mixture was a homogeneous liquid free from a solid.

Then, 278 g(2 mol) of dicyclopentadiene having a purity of 95% was added dropwise from the dropping device over 2 hours with the reaction mixture maintaining a temperature of 120 to 130° C. and, after the dropwise addition, the mixture was further heated at 125° C. for 30 minutes, to obtain a reaction product (first step).

The reaction product was added by 184 g (2.95 mol) of ethylene glycol (EG), 85 g (0.8 mol) of diethylene glycol (DEG) and 30 g (0.2 mol) of phthalic anhydride (PA), and then esterified by heating to 200° C. with removing water distillated from the reaction product. When the acid value of the esterified product reached 22, it was cooled to 120° C. to obtain a dicyclopentadiene-modified unsaturated polyester (second step).

The weight-average molecular weight, number-average molecular weight and the ratio of the weight-average molecular weight to the number-average molecular weight (weight-average molecular weight/number-average molecular weight) of the dicyclopentadiene-modified unsaturated polyester were 23680, 1171 and 20.2, respectively.

60 Parts of the modified unsaturated polyester was mixed with 40 parts of styrene (SM), and then hydroquinone (HQ) was added so that a concentration thereof was 150 ppm based on the total amount, to obtain a dicyclopentadiene-modified unsaturated polyester resin composition (styrene content: 40%, viscosity: 4.5 stokes (25° C.)).

Test Examples 2 to 9

In the same manner as in Test Example 1, except that each amount of raw materials used in the respective steps was varied as shown in Table 1 below, dicyclopentadiene-modified unsaturated polyester resin compositions were produced.

In Test Example 3, the obtained dicyclopentadiene-modified unsaturated polyester had a weight-average molecular weight of 25326, a number-average molecular weight of 1128 and a ratio of weight-average molecular weight to number-average molecular weight of 22.5. In The Test Example 8, the obtained dicyclopentadiene-modified unsaturated polyester had a weight-average molecular weight of 16929, a number-average molecular weight of 1003 and a ratio of weight-average molecular weight to number-average molecular weight of 16.9.

[Example of Producing SMC]

80 Parts of the dicyclopentadiene-modified unsaturated polyester resin composition obtained in the respective Test Examples was mixed with 1.0 part of magnesium as a thickener, 1.0 part of t-butylperoxy benzoate as a curing agent, 150 parts of calcium carbonate as a filler, 20 parts of a polystyrene solution (mixture of 30 parts of polystyrene and 70 parts of styrene) as a low profile additive, 5 parts of a colorant, 0.06 parts of p-benzoquinone as a polymerization inhibitor and 5 parts of zinc stearate as a releasant, to prepare a compound.

The compound was impregnated to glass fibers (reinforcement) having a fiber length of 1 inch to produce SMC, which was then aged at 40° C. for 48 hours. At this time, the content of the glass fibers to the SMC was adjusted to 25%.

Each SMC obtained from the respective dicyclopentadiene-modified unsaturated polyester resin compositions was subjected to compression molding under the following conditions. 6 Kg of each SMC was charged into a ribbed mold having a cavity in size of 1000 mm×650 mm×25 mm, of which the upper mold was heated to 145° C. and the lower mold was heated to 135° C. Then, the SMC was compressed under a molding pressure of 5 MPa for 5 minutes, to obtain a molded article. On compression molding, a glass grain pattern was likely to be generated in the molded article in case where the impregnatability of the compound to glass fibers was poor, and a blister was likely to be generated in the molded article in case where the impregnatability was worse. Accordingly, the impregnatability was evaluated by the glass grain pattern and/or blister found in the resulting molded article. That is, the resulting molded article in which no glass grain pattern was found was represented as "○" (i.e., good impregnatability), the molded good impregnatability), while the molded article having a blister was represented as "×" (i.e., poor impregnatability). which no blister was found was represented as "○" (i.e., good impregnatability), while the molded article having a blister was represented as "×" (i.e., poor impregnatability).

The characteristics of the dicyclopentadiene-modified unsaturated polyester resin compositions obtained in the respective test examples including impregnatabilities to the glass fiber for making SMC are summarized in Table 1.

TABLE 1

|  | MW | Test Ex 1 | Test Ex 2 | Test Ex 3 | Test Ex 4 | Test Ex 5 |
|---|---|---|---|---|---|---|
| Water/DCPD > 1, MA/DCPD ≧ 1.2 |  | ○ | ○ | ○ | ○ | X |
| Water/MA ≦ 1 First step |  | ○ | ○ | ○ | X | ○ |
| MA (mol) | 98 | 4.5 | 3 | 4.5 | 4.5 | 4.5 |
| Water (mol) | 18 | 3 | 2.4 | 3 | 5 | 1.8 |
| DCPD (mol) | 132.2 | 2 | 2 | 2 | 2 | 2 |
| Ratio of raw material (first step) |  |  |  |  |  |  |
| Water/DCPD | Molar ratio | 1.50 | 1.20 | 1.50 | 2.50 | 0.90 |
| MA/DCPD | Molar ratio | 2.25 | 1.50 | 2.25 | 2.25 | 2.25 |
| Water/MA | Molar ratio | 0.67 | 0.8 | 0.67 | 1.11 | 0.40 |
| Second step |  |  |  |  |  |  |
| MA (mol) | 98 | — | 1.5 | — | — | — |
| PG (mol) | 76.1 | — | — | 3.55 | — | — |
| EG (mol) | 62.1 | 2.95 | 2.95 | — | 2.95 | 2.95 |
| DEG (mol) | 106.1 | 0.8 | 0.8 | — | 0.8 | 0.8 |
| PA (mol) | 148.1 | 0.2 | 0.2 | — | 0.2 | 0.2 |
| Ratio of all raw materials |  |  |  |  |  |  |
| DCPD/MA | Molar ratio | 0.44 | 0.44 | 0.44 | 0.44 | 0.44 |
| State of reaction mixture before adding DCPD |  | ○ (homogeneous) | ○ | ○ | X | ○ |
| Characteristics of modified mixture |  |  |  |  |  |  |
| Acid value |  | 22 | 24 | 25 | 26 | 42 |
| Characteristics of resin composition |  |  |  |  |  |  |
| Viscosity (25° C. st) |  | 4.5 | 5.2 | 4.9 | 6.0 | 12.3 |
| Stability (40° C.) |  |  |  |  |  |  |
| gel existence after 1 month |  | ○ (=None) | ○ | ○ | ○ | ○ |
| gel existence after 2 months |  | ○ | ○ | ○ | ○ | X |
| Hot water resistance (time) |  | 250 | 250 | 600 | 175 | 150 |
| Impregnatability to glass fiber |  |  |  |  |  |  |
| Glass grain pattern |  | ○ (=None) | ○ | ○ | ○ | X (=found) |
| Blister |  | ○ (=None) | ○ | ○ | ○ | ○ |

|  | MW | Test Ex 6 | Test Ex 7 | Test Ex 8 | Test Ex 9 |
|---|---|---|---|---|---|
| Water/DCPD > 1, MA/DCPD ≧ 1.2 |  |  |  |  |  |
| Water/MA ≦ 1 First step |  |  |  |  |  |
| MA (mol) | 98 | 4.5 | 2.2 | 4.5 | 2.2 |
| Water (mol) | 18 | 1.8 | 2.1 | 2 | 2.4 |
| DCPD (mol) | 132.2 | 2 | 2 | 2 | 3 |
| Ratio of raw material (first step) |  |  |  |  |  |
| Water/DCPD | Molar ratio | 0.90 | 1.05 | 1.00 | 0.8 |
| MA/DCPD | Molar ratio | 2.25 | 1.10 | 2.25 | 0.73 |
| Water/MA | Molar ratio | 0.40 | 0.95 | 0.44 | 1.09 |
| Second step |  |  |  |  |  |
| MA (mol) | 98 | — | 2.3 | — | 2.3 |
| PG (mol) | 76.1 | 3.5 | — | — | 3.1 |
| EG (mol) | 62.1 | — | 2.95 | 2.95 | — |
| DEG (mol) | 106.1 | — | 0.8 | 0.8 | 0.8 |
| PA (mol) | 148.1 | — | 0.2 | 0.2 | 0.2 |

TABLE 1-continued

| Ratio of all raw materials | | | | | |
|---|---|---|---|---|---|
| DCPD/MA | Molar ratio | 0.44 | 0.44 | 0.44 | 0.67 |
| State of reaction mixture before adding DCPD | | ○ | ○ | ○ | X |
| Characteristics of modified mixture | | | | | |
| Acid value | | 38 | 32 | 27 | 50 |
| Characteristics of resin composition | | | | | |
| Viscosity (25° C. st) | | 11.5 | 7.0 | 5.5 | 12.5 |
| Stability (40° C.) | | | | | |
| gel existence after 1 month | | ○ (=None) | ○ | ○ | ○ |
| gel existence after 2 months | | X | X | X | X |
| Hot water resistance (time) | | 400 | 150 | 250 | 75 |
| Impregnatability to glass fiber | | | | | |
| Glass grain pattern | | X | Δ | Δ | X |
| Blister | | ○ (=None) | ○ | ○ | X |

As is apparent from Table 1, in Test Examples 1 to 3 satisfying both of the main features according to the present invention (Water/DCPD>1 and MA/DCPD≧1.2, and Water/MA≦1), the reaction mixture before adding dicyclopentadiene was homogeneous. In addition, the obtained resin composition had a preferable viscosity, an excellent stability (i.e., the composition was not polymerized even after 2 months) and a good impregnatability to glass fiber (i.e., the resulting molded article is free from glass grain pattern and blister). Moreover, the resulting molded article had a good hot water resistance.

On the other hand, Test Example 9 was a comparative example which failed to satisfy any main feature of the present invention. In the Example, the reaction system on production of the modified polyester was heterogeneous to cause reaction problems. The obtained resin composition had a poor stability, i.e., it was liable to be partially polymerized before molding. The resin composition also had a poor impregnatability to glass fiber (i.e., blister and glass grain pattern were generated in the molded article) and provided a considerably poor hot water resistance to the molded article.

Test Examples 4 to 8 satisfied either one of main features of the present invention. Test Example 4 deviated slightly from the range of the feature of (Water/MA≦1) but satisfied the first features of (Water/DCPD>1 and MA/DCPD≧1.2). The resin composition of this example can be sufficiently utilized for SMC material because of its good stability and impregnatability to the glass fiber. Test Examples 5 to 8 satisfied the feature of (Water/MA≦1) but failed to satisfy the features of (Water/DCPD>1 and MA/DCPD≧1.2). The obtained resin compositions of these examples were not suitable for SMC material due to the slightly poor stability and impregnatability to glass fibers. However, the reaction systems in the examples on production of the modified polyester were homogeneous to cause no reaction problem and also the hot water resistance of the molded articles using the modified polyester resin compositions of the examples were markedly superior than that of Test Example 9. Therefore, the resin compositions in Test Examples 4 to 8 can be sufficiently utilized for a molding material other than SMC or MBC.

Test Example 10

In the same reaction vessel as used in Test Example 1,490 g (5 mol) of maleic anhydride and 580 g (5 mol) of maleic acid were charged and heated to 120° C. Then 72 g (4 mol) of water was added dropwise from the dropping device over 10 minutes with the mixture maintaining a temperature of 120 to 130° C. As a result, the obtained reaction mixture was a homogeneous liquid free from a solid.

Then, 1251 g (9 mol) of dicyclopentadiene having a purity of 95% was added dropwise from the dropping device over 2 hours with the reaction mixture maintaining the same temperature. After the dropwise adding was completed, the mixture was further heated at 125° C. for 30 minutes, to obtain a reaction product having an acid value (addition reaction degree: 97%) of 264 (first step).

To the resulting reaction product, 372 g (6 mol) of ethylene glycol was added, followed by an esterification by heating to 200° C. with removing water distillated from the reaction product. When the acid value of the esterified product reached 26, the esterified product was cooled to 120° C. to obtain 2570 g of a dicyclopentadiene-modified unsaturated polyester (second step).

This modified unsaturated polyester was mixed with 860 g of styrene as a radically polymerizable monomer and 0.7 g of hydroquinone to obtain a dicyclopentadiene-modified unsaturated polyester resin composition (styrene content: 25%, viscosity: 2.5 stokes).

Test Examples 11 to 17

In the same manner as in Test Example 10, except that each amount of raw materials used in the respective reactions was varied as shown in Table 2 below, dicyclopentadiene-modified unsaturated polyester resin compositions were produced.

The state of the reaction mixture before adding DCPD (i.e., whether a solid deposited or not) in Test Examples 10 to 17 to produce dicyclopentadiene-modified unsaturated polyester resin compositions, and the hot water resistance (aforementioned) of the molded articles by using the resin compositions are summarized in Table 2.

TABLE 2

| | MW | Test Ex 10 | Test Ex 11 | Test Ex 12 | Test Ex 13 |
|---|---|---|---|---|---|
| Water/MA ≦ 1 First step | | ○ | ○ | ○ | ○ |
| MA (mol) | 98 | 5 | 10 | 10 | 6 |
| Maleic acid | | 5 | — | — | — |
| Water (mol) | 18 | 4 | 9 | 10 | 4 |
| DCPD (mol) | 132.2 | 9 | 9 | 9 | 4 |
| Ratio of raw materials (first step) | | | | | |
| Water/MA | Molar ratio | 0.8 | 0.9 | 1.0 | 0.7 |
| DCPD/MA | Molar ratio | 0.90 | 0.90 | 0.90 | 0.67 |
| Second step | | | | | |
| EG (mol) | 62.1 | 6 | 6 | 6 | — |
| PG (mol) | 76 | — | — | — | 5 |
| IPA (mol) | 98 | — | — | — | 1 |
| Ratio of all raw materials | | | | | |
| DCPD/MA | Molar ratio | 0.9 | 0.9 | 0.9 | 0.67 |
| State of reaction mixture before adding DCPD (Note) | | ○ | ○ | Δ | ○ |
| Characteristics of modified mixture | | | | | |
| Acid value | | 26 | 26 | 21 | 20 |
| Characteristics of resin composition | | | | | |
| Viscosity (25° C. st) | | 2.5 | 2.5 | 2.5 | 3.0 |
| Hot water resistance (time) | | 230 | 230 | 230 | 580 |

| | MW | Test Ex 14 | Test Ex 15 | Test Ex 16 | Test Ex 17 |
|---|---|---|---|---|---|
| Water/MA ≦ 1 First step | | ○ | X | X | X |
| MA (mol) | 98 | 6 | 10 | 10 | 6 |
| Maleic acid | | — | — | — | — |
| Water (mol) | 18 | 2 | 11 | 14 | 7 |
| DCPD (mol) | 132.2 | 2 | 9 | 9 | 4 |
| Ratio of raw materials (first step) | | | | | |
| Water/MA | Molar ratio | 0.3 | 1.1 | 1.4 | 1.2 |
| DCPD/MA | Molar ratio | 0.33 | 0.90 | 0.90 | 0.67 |
| Second step | | | | | |
| EG (mol) | 62.1 | — | 6 | 6 | — |
| PG (mol) | 76 | 6.7 | — | — | 5 |
| IPA (mol) | 98 | 1.5 | — | — | 1 |
| DCPD/MA | Molar ratio | 0.33 | 0.9 | 0.9 | 0.67 |
| State of reaction mixture before adding DCPD (Note) | | ○ | X | XX | X |
| Characteristics of modified mixture | | | | | |
| Acid value | | 20 | 23 | 30 | 20 |
| Characteristics of resin composition | | | | | |
| Viscosity (25° C. st) | | 6.0 | 2.8 | 5.0 | 3.2 |
| Hot water resistance (time) | | 580 | 180 | 80 | 430 |

EG: Ethylene glycol
PG: Propylene glycol
IPA: Isophthalic acid
(Note)
○: No solid deposited.
Δ: A slight amount of solid deposited.
X: A medium amount of solid deposited.
XX: A large amount of solid deposited.

As is apparent from Table 2, the results can be discussed as follows.

Test Examples 10 to 14 were examples in which a ratio of water to MA in the first step was 1 or less. In these Examples, the reaction mixture before adding cyclopentadiene was free from deposition of a solid and the resulting modified unsaturated polyester was superior in handling because of its low viscosity. Moreover, it was found that each molded article obtained from the resin compositions had an excellent hot water resistance.

On the other hand, Test Examples 15 to 17 were comparative examples in which a ratio of water to MA exceeds 1. In these Examples, a solid was deposited in the reaction mixture before adding cyclopentadiene and the reaction system was heterogeneous, resulting in an unsatisfactory hot water resistance. Although Test Example 17 showed a better hot water resistance than the other comparative examples, it was much worse that that of Test Example 13 wherein all conditions were the same, except for a ratio of water to MA.

What is claimed is:

1. A dicyclopentadiene-modified unsaturated polyester produced by a process comprising the steps of:
    a) reacting maleic anhydride with water at a temperature of 100° C. to 140° C. to obtain a reaction mixture;
    b) reacting the reaction mixture with dicyclopentadiene (DCPD), a molar ratio ($H_2O$/DCPD) of water to dicyclopentadiene being greater than 1 and a molar ratio (MA/DCPD) of maleic anhydride to dicyclopentadiene being 1.2 or more; and
    c) reacting the reaction product obtained in step b) with a polyhydric alcohol, or a polyhydric alcohol and a polybasic acid, to obtain an unsaturated polyester modified with dicyclopentadiene, wherein the dicyclopentadiene-modified unsaturated polyester has a weight-average molecular weight of 8000 or more and a ratio of weight-average molecular weight to number-average molecular weight of from 5 to 50.

2. The dicyclopentadiene-modified unsaturated polyester of claim 1, wherein in step b), said molar ratio (MA/DCPD) is 1.5 or more.

3. A dicyclopentadiene-modified unsaturated polyester resin composition, comprising:
    a) the dicyclopentadiene-modified unsaturated polyester of claim 1; and
    b) a radically polymerizable monomer.

4. A molding material, comprising a dicyclopentadiene-modified unsaturated polyester resin composition, the resin composition comprising:
    a) the dicyclopentadiene-modified unsaturated polyester of claim 1; and
    b) a radically polymerizable monomer.

5. The molding material of claim 4, further comprising a reinforcing fiber holding the dicyclopentadiene-modified unsaturated polyester resin composition.

6. A dicyclopentadiene-modified unsaturated polyester produced by a process comprising the steps of:
    a) reacting maleic anhydride with water at a temperature of 100° to 140° C. to obtain a reaction mixture, a molar ratio ($H_2O$/MA) of water to maleic anhydride being 1 or less;
    b) reacting the reaction mixture with dicyclopentadiene; and
    c) reacting the reaction product obtained in the second step with a polyhydric alcohol, or a polyhydric alcohol and a polybasic acid to obtain an unsaturated polyester modified with dicyclopentadiene, wherein the dicyclopentadiene-modified unsaturated polyester has a weight-average molecular weight of 8000 or more and a ratio of weight-average molecular weight to number-average molecular weight of from 5 to 50.

7. A dicyclopentadiene-modified unsaturated polyester resin composition, comprising:
    a) the dicyclopentadiene-modified unsaturated polyester of claim 6; and
    b) a radically polymerizable monomer.

8. A molding material, comprising a dicyclopentadiene-modified unsaturated polyester resin composition, the resin composition, comprising:
    a) the dicyclopentadiene-modified unsaturated polyester of claim 6; and
    b) a radically polymerizable monomer.

9. The molding material of claim 8, further comprising a reinforcing fiber holding the dicyclopentadiene-modified unsaturated polyester resin composition.

10. A dicyclopentadiene-modified unsaturated polyester produced by a process comprising the steps of:
    a) reacting maleic anhydride with water at a temperature of 100 to 140° C. to obtain a reaction mixture, a molar ration ($H_2O$/MA) of water to maleic anhydride being 1 or less;
    b) reacting the reaction mixture with dicyclopentadiene, a molar ratio of ($H_2O$/DCPD) of water to dicyclopentadiene being greater than one, a molar ratio of (MA/DCPD) of maleic anhydride to dicyclopentadiene being 1.2 or more; and
    c) reacting the reaction product obtained in the second step with a polyhydric alcohol, or a polyhydric alcohol and a polybasic acid, to obtain an unsaturated polyester modified with dicyclopentadiene, wherein the dicyclopentadiene-modified unsaturated polyester has a weight-average molecular weight of 8,000 or more and a ratio of weight-average molecular weight to number-average molecular weight of from 5 to 50.

11. The dicyclopentadiene-modified unsaturated polyester resin composition of claim 10, wherein in step b), said molar ratio (MA/DCPD) is 1.5 or more.

12. A dicyclopentadiene-modified unsaturated polyester resin composition, comprising:
    a) the dicyclopentadiene-modified unsaturated polyester of claim 10; and
    b) a radically polymerizable monomer.

13. A molding material, comprising a dicyclopentadiene-modified unsaturated polyester resin composition, the resin composition, comprising:
    a) the dicyclopentadiene-modified unsaturated polyester of claim 10; and
    b) a radically polymerizable monomer.

14. The molding material of claim 8, further comprising a reinforcing fiber holding the dicyclopentadiene-modified unsaturated polyester resin composition.

* * * * *